(12) United States Patent
Koseoglu

(10) Patent No.: US 9,580,661 B2
(45) Date of Patent: Feb. 28, 2017

(54) INTEGRATED HYDROCARBON DESULFURIZATION WITH OXIDATION OF DISULFIDES AND CONVERSION OF $SO_2$ TO ELEMENTAL SULFUR

(71) Applicant: Saudi Arabian Oil Company, Dhahran (SA)

(72) Inventor: Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 150 days.

(21) Appl. No.: 14/552,222

(22) Filed: Nov. 24, 2014

(65) Prior Publication Data

US 2016/0145502 A1    May 26, 2016

(51) Int. Cl.

| | |
|---|---|
| *C10G 27/06* | (2006.01) |
| *B01D 53/50* | (2006.01) |
| *B01D 53/52* | (2006.01) |
| *C01B 17/50* | (2006.01) |
| *C10G 19/02* | (2006.01) |
| *C01B 17/04* | (2006.01) |

(52) U.S. Cl.
CPC ............... *C10G 27/06* (2013.01); *B01D 53/50* (2013.01); *B01D 53/523* (2013.01); *C01B 17/04* (2013.01); *C01B 17/508* (2013.01); *C10G 19/02* (2013.01)

(58) Field of Classification Search
CPC ......... C10G 27/06; C10G 19/02; B01D 53/50; B01D 53/523; C01B 17/20; C01B 17/508; C01B 17/0253
See application file for complete search history.

(56) References Cited

U.S. PATENT DOCUMENTS

| | | |
|---|---|---|
| 3,978,137 A | 8/1976 | Frame |
| 4,020,144 A | 4/1977 | Bosniack |
| 4,036,942 A | 7/1977 | Sibeud et al. |
| 4,347,225 A | 8/1982 | Audeh et al. |
| 4,347,226 A | 8/1982 | Audeh et al. |
| 4,875,997 A | 10/1989 | Langford |
| 5,508,013 A | 4/1996 | Kvasnikoff et al. |
| 7,803,339 B2 | 9/2010 | Carlsson |
| 2006/0057056 A1 | 3/2006 | Chretien |
| 2013/0026072 A1 | 1/2013 | Bourane et al. |
| 2013/0028822 A1 | 1/2013 | Bourane et al. |
| 2013/0277236 A1 | 10/2013 | Hein et al. |
| 2014/0208998 A1 | 7/2014 | Nougayrede et al. |

OTHER PUBLICATIONS

International Search Report and Written Opinion mailed Feb. 12, 2016 in counterpart International Application PCT/US2015/05847.

*Primary Examiner* — Randy Boyer
*Assistant Examiner* — Juan Valencia
(74) *Attorney, Agent, or Firm* — Abelman, Frayne & Schwab

(57) ABSTRACT

A process to produce a sulfur-free hydrocarbon product stream from a liquid hydrocarbon disulfide product, e.g., of the Merox Process, includes subjecting the hydrocarbon disulfide to a catalytic oxidation step to produce $SO_2$ which is separated from the remaining desulfurized hydrocarbons that form the clean sulfur-free hydrocarbon product stream; the $SO_2$ is introduced into a Claus processing unit with the required stoichiometric amount of hydrogen sulfide ($H_2S$) gas to produce elemental sulfur.

27 Claims, 3 Drawing Sheets

INTEGRATED HYDROCARBON DESULFURIZATION WITH OXIDATION OF DISULFIDES AND CONVERSION OF $SO_2$ TO ELEMENTAL SULFUR

FIELD OF THE INVENTION

This invention relates to an integrated process for treating hydrocarbon disulfides to produce clean hydrocarbon fuels and elemental sulfur.

BACKGROUND OF THE INVENTION

Mercaptans are undesirable because of their unpleasant odor and corrosivity and also because they degrade the stability of end-product fuels. The liquid disulfides created by conversion of the mercaptans do not have these undesirable characteristics and can be retained in the Merox treated fuels or removed and used elsewhere in the petroleum refinery. The Merox process is generally more economical than a catalytic hydrodesulfurization process and achieves much the same result. Economic and practical drawbacks associated with hydrodesulfurization processes include additional dedicated facilities to which the disulfide compounds must be transferred, use of expensive and sensitive catalysts and the treatment and disposal of the by-product sulfur-containing compounds.

Processes in oil refineries and natural gas processing plants that remove mercaptans and/or hydrogen sulfide ($H_2S$) are commonly referred to as sweetening processes because they result in products which no longer have the sour, foul odors of mercaptans and hydrogen sulfide. The liquid hydrocarbon disulfides can remain in the sweetened end products; or they can be used as part of the petroleum refinery or natural gas processing plant fuel; or they may be subjected to further downstream processing.

One proprietary catalytic mercaptan oxidation process widely used in petroleum refineries and natural gas processing plants to remove mercaptans contained in end-products such as LPG, propane, butanes, light naphthas, kerosene and jet fuel by converting them into liquid hydrocarbon disulfides is known as the Merox process. It is an integrated process comprising the mercaptan extraction step in which mercaptans react with an aqueous caustic solution in the presence of a catalyst, to form sodium alkylthiolate, which is then oxidized in a wet air oxidation step to produce disulfides and a regenerated caustic solution which is recycled back to the extraction step. The Merox process requires an alkaline environment which, in some versions of the process, is provided by an aqueous solution of sodium hydroxide (NaOH), a strong base, commonly referred to as caustic. In other versions of the process, the alkalinity is provided by ammonia, which is a relatively weaker base than sodium hydroxide and must be handled with special care due to its irritant and toxicity properties.

The stepwise reaction schemes for the Merox process beginning with the treatment of the mercaptan is as follows:

$$2RSH + 2NaOH \rightarrow 2NaSR + 2H_2O \qquad (1)$$

In the above reaction, RSH is a mercaptan and R is an organic group such as a methyl, ethyl, propyl or other hydrocarbon group. For example, the ethyl mercaptan (ethanethiol) has the formula $C_2H_5SH$.

The catalyst used in some versions of the Merox process is a water-soluble liquid and in other versions, the catalyst is impregnated onto charcoal granules.

The second step is referred to as regeneration and it involves heating and oxidizing the caustic solution leaving the extractor. The oxidation results in converting the extracted mercaptans to organic disulfides (RSSR). These disulfides are water-insoluble liquids that are separated and decanted from the aqueous caustic solution. The regeneration reaction scheme is as follows:

$$4NaSR + O_2 + 2H_2O \rightarrow 2RSSR + 4NaOH \qquad (2)$$

On a global basis, Merox mercaptan oxidation units are commonly found in refineries and the disulfides generated are blended with the fuel oil and are typically burned as fuel to produce stream or provide other utilities. This use can raise environmental concerns where the combustion gases with sulfur-containing constituents are emitted in the refinery. In some cases, the disulfides are added to an automotive fuel, or retained as part of the fuel blend; however with increasingly stringent fuel sulfur specifications, it is foreseeable that this use may be eliminated entirely.

The Claus process is a well-established commercial process for recovering elemental sulfur from gaseous hydrogen sulfide found in oil refineries, natural gas processing plants and other industrial facilities. The Claus process includes a thermal and a catalytic step. In the controlled thermal step, one third of the $H_2S$ is oxidized to $SO_2$ in a furnace operating at a temperature of about 1000° C. This ensures a stoichiometric reaction for the subsequent catalytic step in which a 2:1 mix of $H_2S$ and $SO_2$ passes through a fixed bed of activated alumina or titania-based catalysts maintained at a temperature in the range of from 200°-350° C. to produce elemental sulfur and water.

$$2H_2S + SO_2 \rightarrow 3S + 2H_2O \qquad (3)$$

The problem addressed by the present invention is the need for an economical and effective method for the recovery of a clean, sulfur-free hydrocarbon fuel from liquid disulfides, and particularly the hydrocarbon disulfides produced in the caustic processing of mercaptan-containing hydrocarbon product streams, and specifically the Merox process.

SUMMARY OF THE INVENTION

The above needs are met and other advantages are provided by the process of the present invention that integrates a catalytic oxidation step to treat the liquid hydrocarbon disulfide product of the Merox Process to produce $SO_2$ which is separated from the remaining desulfurized hydrocarbons that form the clean sulfur-free hydrocarbon product stream. The $SO_2$ is introduced into a Claus processing unit with the required stoichiometric amount of hydrogen sulfide ($H_2S$) gas to produce elemental sulfur.

For the practice of the catalytic oxidation step, it has been determined that catalysts disclosed in US 2013/0026072 and US 2013/0028822, which are commonly owned with the present application, are particularly useful in the practice of the gaseous oxidation of the hydrocarbon disulfides in the process of this invention. The catalyst compositions useful in the oxidative desulfurization of gaseous sulfur-containing hydrocarbons are those that comprise specific amounts and ranges of copper oxide, zinc oxide, aluminum oxide and, optionally, cerium. The disclosures of US 2013/0026072 and US 2013/0028822 are incorporated herein by reference.

One particular advantage of converting the sulfur dioxide generated in the oxidation step is the complete or partial elimination of the thermal hydrogen sulfide conversion step in the conventional Claus Process.

BRIEF DESCRIPTION OF THE DRAWINGS

The invention will be described in greater detail below and with reference to the attached drawings in which.

DETAILED DESCRIPTION OF PREFERRED EMBODIMENTS

Figure 1:
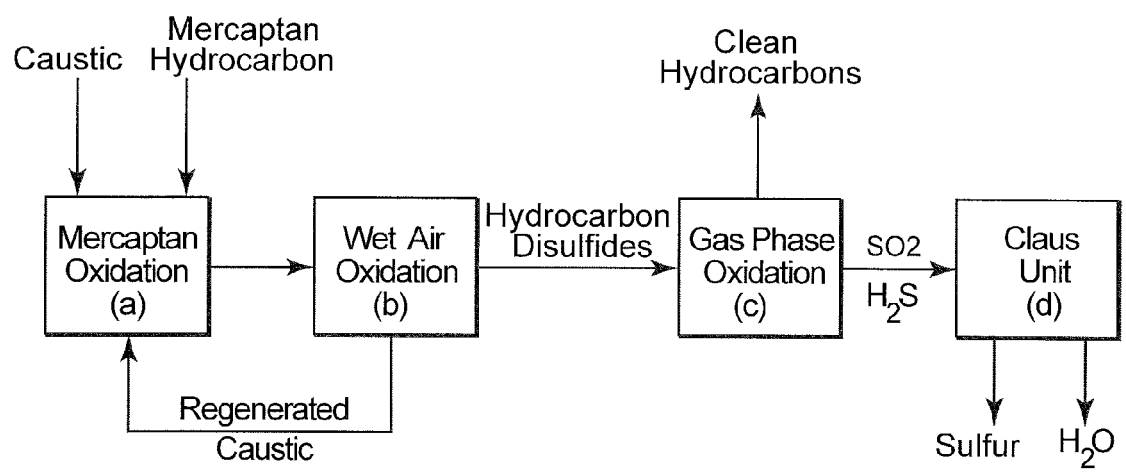
FIG. 1 is a simplified schematic illustration of the process.

Referring now to the schematic illustration FIG. 1, the integrated process of the invention for treating liquid hydrocarbon disulfide products, e.g., by-products of the Merox process, comprises the following steps:

(a) a mercaptan oxidation step to produce spent caustic solution and mercaptan-free hydrocarbons;

(b) a wet air oxidation step to regenerate the spent caustic solution and produce by-product liquid hydrocarbon disulfides;

(c) an oxidation step to oxidize the hydrocarbon disulfides to produce sulfur dioxide ($SO_2$) and hydrocarbons which are separated to provide a sulfur-free liquid hydrocarbon product stream; and (d) a gaseous desulfurization step in which $SO_2$ is reacted with hydrogen sulfide to produce elemental sulfur.

It will be understood by one of ordinary skill in the art that steps (a) and (b) correspond to the conventional Merox process and step (d) corresponds to the conventional Claus process. The liquid mercaptan hydrocarbon stream can have a sulfur content of from about 10 to about 60 wt %.

Addition of the oxidation step (c) between the Merox and Claus processes efficiently converts hydrocarbon disulfides into sulfur dioxide and light hydrocarbon gases and/or liquids which can be used as clean fuel in the refinery. The sulfur dioxide generated is sent to the Claus process unit and fully or partially eliminates the need for the conventional thermal hydrogen sulfide conversion step, because there is no need to produce sulfur dioxide from a portion of the $H_2S$ as in the conventional Claus process to react with the remaining hydrogen sulfide in the production of elemental sulfur.

Oxidation of Dimethyldisulfide

Figure 2:
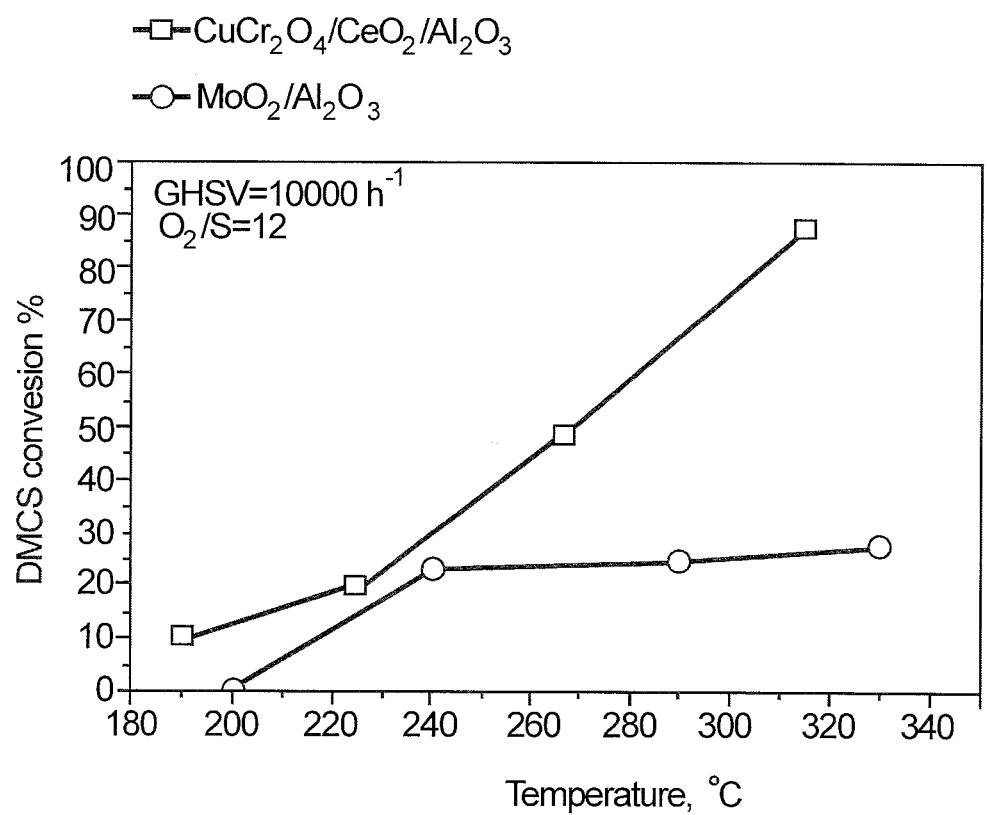
FIG. 2 is a comparative plot of the percent conversion of dimethyldisulfide (DMDS) for two different catalyst systems with a ratio of $O_2/S$ equal to 12.
Figure 3:
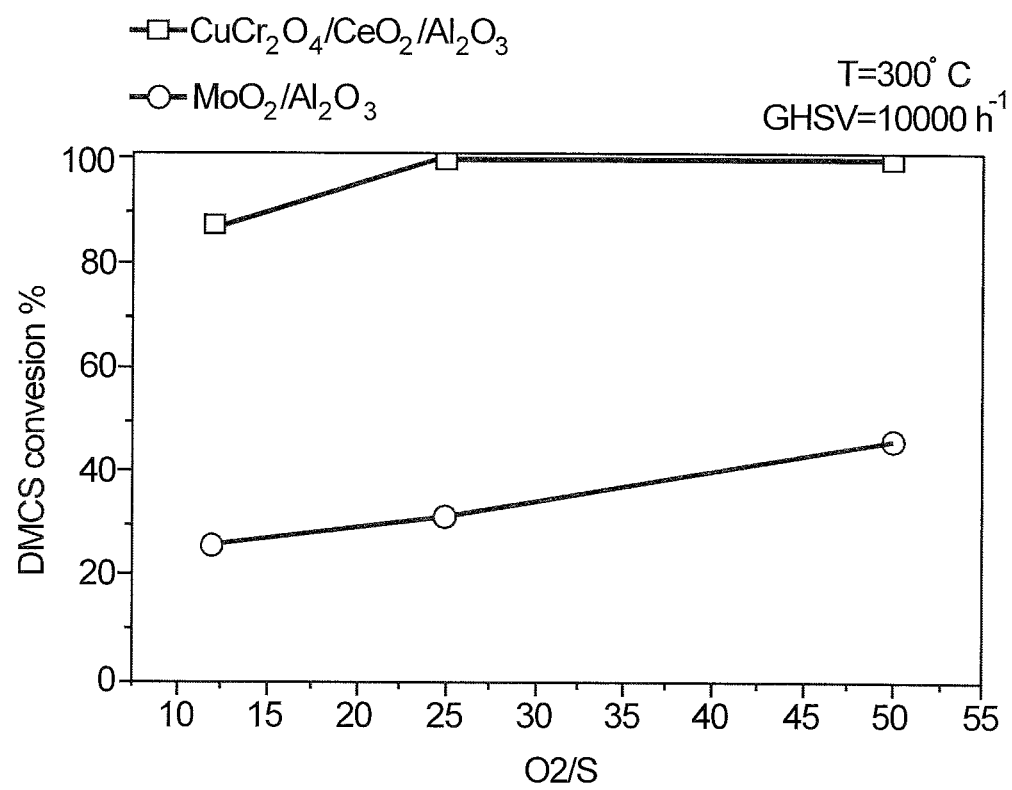
FIG. 3 is a comparative plot of the percent conversion of DMDS for varying ratios of $O_2/S$ for the two catalyst systems shown in FIG. 2.

A comparative study was undertaken of the activity of the catalyst systems: $MoO_3/Al_2O_3$ and $CuCr_2O_4/12\%$ $CeO_2$ in the oxidative desulfurization of octane containing 0.5 W % of S as dimethyldisulfide (DMDS) under a representative range of conditions. The reactions were carried out under conditions that included the same GHSV=10000 h−1 and temperatures in the range of 300° C. plus or minus 30° C. The catalyst loading was 2 cm³, and the $O_2/S$ ratio was varied in the range of from 12-60, and a WHSV $h^{-1}$ as indicated below. The results are summarized in Table 1 and the data is illustrated in FIGS. 2 and 3. As shown by the data, 100 W % conversion of DMDS was achieved over the $CuCr_2O_4/CeO_2/Al_2O_3$ catalyst, at an $O_2/S$ ratio of 26 and the other conditions as indicated.

TABLE 1

| # | Catalysts | Temp., °C. | $O_2/S$ | GHSV, $h^{-1}$ | WHSV, $h^{-1}$ | DMDS Conversion. W % | DS in liquid, W % |
|---|---|---|---|---|---|---|---|
| 1 | $MoO_3/Al_2O_3$ | 300 | 60 | 10000 | 16 | 51 | |
| 2 | $MoO_3/Al_2O_3$ | 330 | 12 | 10000 | 41 | 36 | 46 |
| 3 | $MoO_3/Al_2O_3$ | 300 | 28 | 10000 | 27 | 35 | |
| 4 | $MoO_3/Al_2O_3$ | 300 | 57 | 10000 | 15 | 51 | |
| 5 | $MoO_3/Al_2O_3$ | 270 | 14 | 10000 | 30 | 49 | 46 |
| 6 | $CuCr_2O_4/CeO_2/Al_2O_3$ | 291 | 26 | 10000 | 26 | 100 | 85 |
| 7 | $CuCr_2O_4/CeO_2/Al_2O_3$ | 315 | 13 | 10000 | 19 | 88 | |
| 8 | $CuCr_2O_4/CeO_2/Al_2O_3$ | 310 | 13 | 10000 | 30 | 70 | 70 |

From the above description and examples, it is apparent that the present invention provides an economical and effective method for the recovery of a clean, sulfur-free hydrocarbon fuel from liquid disulfides, including specifically the liquid hydrocarbon disulfides produced in the caustic processing of mercaptan-containing hydrocarbon product streams. The disclosed process has widespread applicability to large scale operations such as refineries and gas processing plants where the disulfides can be processed to remove their sulfur constituent and provide an environmentally acceptable clean-burning hydrocarbon fuel.

Modifications and variations on the process can be made and derived from the above description and the scope of the invention is to be determined by the claims that follow.

The invention claimed is:

1. In the process for treating a liquid hydrocarbon feedstream to remove mercaptans present in the stream by
   a. contacting the mercaptan-containing hydrocarbon feedstream with an aqueous caustic solution to oxidize the mercaptans and produce a spent caustic solution and mercaptan-free hydrocarbons;
   b. subjecting the spent caustic and hydrocarbons to a wet air oxidation step to regenerate the spent caustic and produce a liquid hydrocarbon disulfide product;
   c. separating the regenerated aqueous caustic solution from the hydrocarbon disulfide and recycling the caustic to step (a);
   the improvement comprising:
   d. oxidizing the hydrocarbon disulfide product to sulfur dioxide and a hydrocarbon product stream that is substantially free of sulfur;
   e. separating and recovering the hydrocarbon product stream;

f. reacting the sulfur dioxide with H₂S in a predetermined stoichiometric ratio to produce an elemental sulfur product and water; and g. recovering the sulfur.

2. The process of claim 1 in which the caustic is selected from the group consisting of aqueous solutions of sodium hydroxide, ammonia, potassium hydroxide, and combinations thereof.

3. The process of claim 1 which includes subjecting the H₂S to an oxidation reaction to convert a predetermined portion of the H₂S to sulfur dioxide in order to achieve a stoichiometric ratio of 2H₂S:SO₂ to complete the sulfur-producing reaction:

$$2H_2S + SO_2 \rightarrow 3S + 2H_2O.$$

4. The process of claim 1 in which the hydrocarbon disulfide is oxidized in the presence of a catalyst.

5. The process of claim 4 in which the catalyst is selected from the group consisting of catalytic compositions comprising copper oxide in an amount ranging from 10 weight percent (wt %) to 50 wt %, zinc oxide in an amount ranging from 5 wt % to less than 20 wt %, and aluminum oxide in an amount ranging from 20 wt % to 70 wt %, wherein said catalytic composition has an X-ray amorphous oxide phase, and a formula $Cu_xZn_{1-x}Al_2O_4$, wherein x ranges from 0 to 1, highly dispersed crystalline ZnO and CuO alone and said composition further comprises CeO₂ in the form of particles ranging in diameter from 5 nm to 10 nm, in an amount ranging from 0.1 wt % to 10 wt % of said catalytic composition, and combinations thereof.

6. The process of claim 5 in which the catalyst composition comprises from 20 wt % to 45 wt % CuO, from 10 wt % to less than 20 wt % ZnO, and from 20 wt % to 70 wt % Al₂O₃.

7. The process of claim 6 in which the catalyst composition comprises from 30 wt % to 45 wt % CuO, from 12 wt % to less than 20 wt % ZnO, and from 20 wt % to 40 wt % Al₂O₃.

8. The process of claim 4 in which the oxidation catalyst is CuCr₂O₄/CeO₂/Al₂O₃.

9. The process of claim 1 in which the liquid hydrocarbon disulfide product has a sulfur content in the range of from 10 to 60 wt %.

10. The process of claim 1 in which the hydrocarbon disulfide is contacted with the oxidation catalyst at a temperature in the range of from 200° C. to 600° C.

11. The process of claim 4 in which the hydrocarbon disulfide is contacted with the oxidation catalyst under conditions that include a molar ratio of O₂:C in a range of from 1:100 to 1:10 and a molar ratio of O₂:S is in the range of from 1:1 to about 150:1.

12. The process of claim 4 in which the hydrocarbon disulfide is contacted with the oxidation catalyst under conditions that include a weight hourly space velocity (WHSV) that is in the range of from 1 h−1 to 100 h−1.

13. The process of claim 4 in which the hydrocarbon disulfide is contacted with the oxidation catalyst under conditions that include a gas hourly space velocity (GHSV) that is in the range of from 1,000 h−1 to 25,000 h−1.

14. The process of claim 4 in which the hydrocarbon disulfide is contacted with the oxidation catalyst under conditions that include an operating pressure that is in the range of from 1 bar to 30 bars.

15. The process of claim 4 in which the hydrocarbon disulfide is contacted with the oxidation catalyst under conditions that include an operating pressure that is in the range of from 1 bar to 5 bars, a weight hourly space velocity (WHSV) that is in the range of from 10h−1 to 30h−1, and a as hourly space velocity (GHSV) that is in the range of from 5,000 h−1 to 10,000 h−1.

16. The process of claim 1. in which the hydrocarbon disulfide is contacted with the oxidation catalyst at a temperature in the range of from about 250° C. to about 550° C.

17. The process of claim 1 in which the hydrocarbon disulfide is contacted with the oxidation catalyst at a temperature in the range of from about 300° C. to about 500° C.

18. The process of claim 4 in which the hydrocarbon disulfide is contacted with the oxidation catalyst under conditions that include a molar ratio of O₂:C in a range of from 1:50 to 1:10 and a molar ratio of O₂:S is in the range of from 1:1 to about 150:1.

19. The process of claim 4 in which the hydrocarbon disulfide is contacted with the oxidation catalyst under conditions that include a molar ratio of O₂:C in a range of from 1:20 to 1:10 and a molar ratio of O₂:S is in the range of from 1:1 to about 150:1.

20. The process of claim 4 in which the hydrocarbon disulfide is contacted with the oxidation catalyst under conditions that include a molar ratio of O₂:C in a range of from 1:100 to 1:10, and a molar ratio of O₂:S is in the range of from 10:1 to 100:1.

21. The process of claim 4 in which the hydrocarbon disulfide is contacted with the oxidation catalyst under conditions that include a molar ratio of O₂:C in a range of from 1:100 to 1:10 and a molar ratio of O₂:S is in the range of from 20:1 to 50:1.

22. The process of claim 4 in which the hydrocarbon disulfide is contacted with the oxidation catalyst under conditions that include a weight hourly space velocity (WHSV) that is in the range of from 5 h−1 to 50 h−1.

23. The process of claim 4 in which the hydrocarbon disulfide is contacted with the oxidation catalyst under conditions that include a weight hourly space velocity (WHSV) that is in the range of from 10 h−1 to 30 h−1.

24. The process of claim 4 in which the hydrocarbon disulfide is contacted with the oxidation catalyst under conditions that include a gas hourly space velocity (GHSV) that is in the range of from 5,000 h−1 to 15,000 h−1.

25. The process of claim 4 in which the hydrocarbon disulfide is contacted with the oxidation catalyst under conditions that include a gas hourly space velocity (GHSV) that is in the range of from 5,000 h−1 to 10,000 h−1.

26. The process of claim 4 in which the hydrocarbon disulfide is contacted with the oxidation catalyst under conditions that include an operating pressure that is in the range of from 1 bar to 10 bars.

27. The process of claim 4 in which the hydrocarbon disulfide is contacted with the oxidation catalyst under conditions that include an operating pressure that is in the range of from 1 bar to 5 bars.

* * * * *